(12) United States Patent
Gaines et al.

(10) Patent No.: US 8,400,071 B2
(45) Date of Patent: Mar. 19, 2013

(54) LED LAMP POWER MANAGEMENT SYSTEM AND METHOD

(75) Inventors: James Gaines, Glen Ellyn, NY (US); Bernd Clauberg, Schaumburg, IL (US); Josephus A. M. Van Erp, Asten (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 327 days.

(21) Appl. No.: 12/746,540

(22) PCT Filed: Dec. 2, 2008

(86) PCT No.: PCT/IB2008/055036
§ 371 (c)(1),
(2), (4) Date: Jun. 7, 2010

(87) PCT Pub. No.: WO2009/072058
PCT Pub. Date: Jun. 11, 2009

(65) Prior Publication Data
US 2010/0244707 A1    Sep. 30, 2010

Related U.S. Application Data

(60) Provisional application No. 61/012,127, filed on Dec. 7, 2007.

(51) Int. Cl.
*H05B 37/00* (2006.01)

(52) U.S. Cl. .................. 315/247; 315/185 S; 315/224; 315/291; 315/312

(58) Field of Classification Search .................. 315/247, 315/224, 185 S, 307, 291, 312–326
See application file for complete search history.

(56) References Cited

U.S. PATENT DOCUMENTS
7,081,722 B1    7/2006  Huynh et al.

FOREIGN PATENT DOCUMENTS
| EP | 1589519 A2 | 10/2005 |
| WO | 2004057924 A1 | 7/2004 |
| WO | 2005020640 A1 | 3/2005 |
| WO | 2006107199 A2 | 10/2006 |

*Primary Examiner* — Tuyet Thi Vo
(74) *Attorney, Agent, or Firm* — Mark Beloborodov

(57) ABSTRACT

An LED lamp power management system and method including an LED lamp having an LED controller 58; a plurality of LED channels 60 operably connected to the LED controller 58, each of the plurality of LED channels 60 having a channel switch 62 in series with at least one shunted LED circuit 83, the shunted LED circuit 83 having a shunt switch 68 in parallel with an LED source 80. The LED controller 58 reduces power loss in one of the channel switch 62 and the shunt switch 68 when LED lamp electronics power loss ($P_{loss}$) exceeds an LED lamp electronics power loss limit ($P_{lim}$); and each of the channel switches 62 receives a channel switch control signal 63 from the LED controller 58 and each of the shunt switches 68 receives a shunt switch control signal 69 from the LED controller 58.

10 Claims, 4 Drawing Sheets

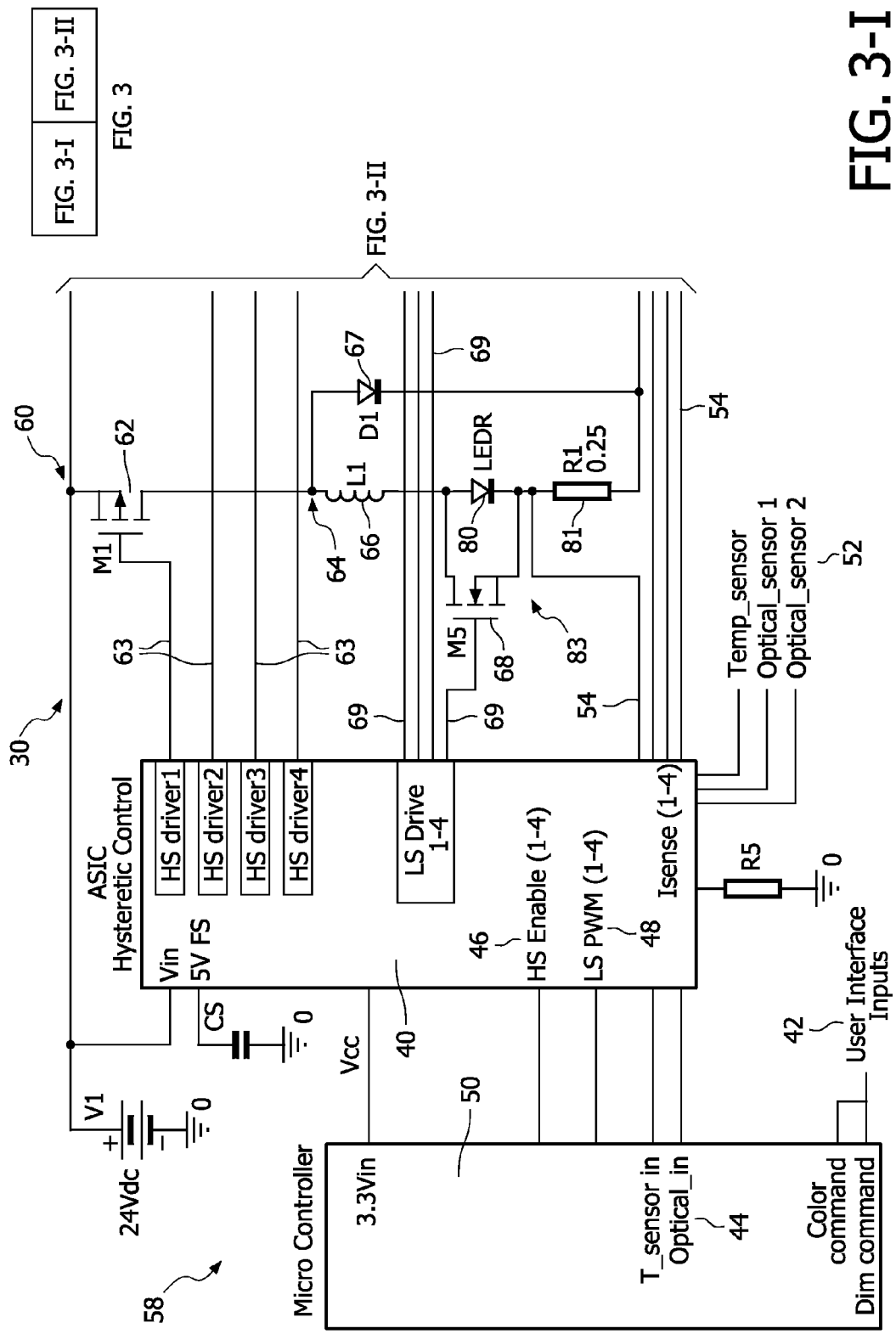
FIG. 3-I

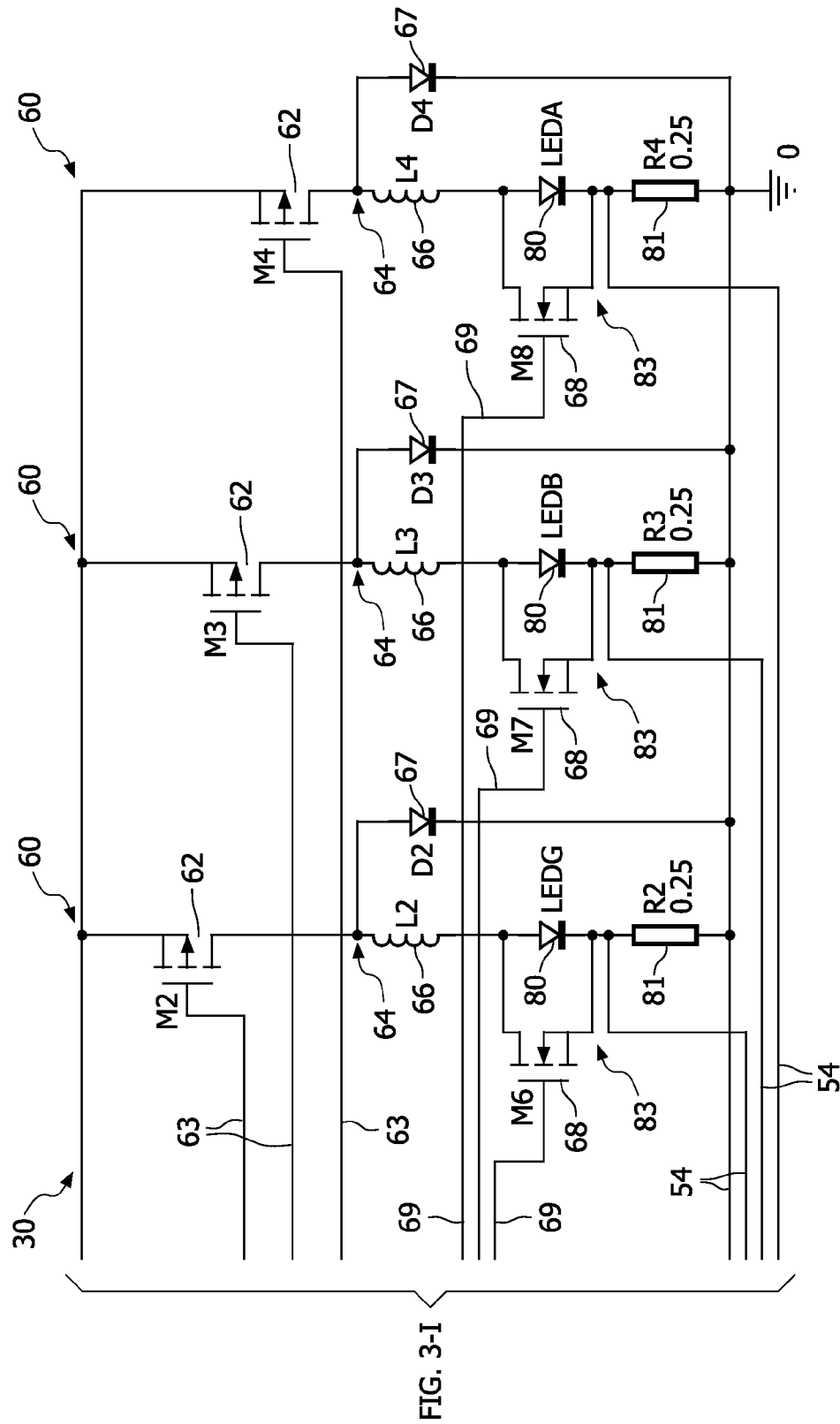
FIG. 3-I | FIG. 3-II

LED LAMP POWER MANAGEMENT SYSTEM AND METHOD

This invention was made with United States government support awarded by the U.S. Department of Energy Contract Number DE-FC26-05NT42342. The United States government has certain rights in this invention.

The technical field of this disclosure is power supplies, particularly, an LED lamp power management system and method.

Traditionally, incandescent and fluorescent illuminating devices have been used as light sources in automobiles and other vehicles. However, significant advances in the technology of light emitting diodes (LEDs) have made LEDs attractive for use in vehicles, because of their long operating life, high efficiency, and low profile. LEDs can now generate white light nearly as efficiently as a compact fluorescent lamp, and efficiencies are expected to increase. To fully realize the energy savings of the LEDs, the electronics that drive them must also be efficient.

Self-contained LED lamps, such as LED System-in-Modules (LED SIMs), for general lighting applications are being developed that use multiple, different colored LEDs with one or a limited number of integrated circuits. The integrated circuits include sensing, drive, and control circuits for the LED lamp. The user is able to control the lamp color and intensity.

To generate light over the visible spectrum, the light output from different color LEDs can be combined in particular proportions to produce a desired color from an LED lamp. For example, one LED can generate red light, one can generate green light, and one can generate blue light. The Red-Green-Blue (RGB) combination can generate any color desired and can be supplemented with an LED generating amber (A) or white (W) light to adjust the color rendering index (CRI) of the lamp. The CRI indicates how well the lamp renders colors of objects compared to a standard illumination source, such as daylight or an incandescent lamp. RGBA and RGBW indicate Red-Green-Blue-Amber and Red-Green-Blue-White four LED lamps, respectively, with the number four indicating the number of LED colors used in the LED lamp.

Electrical current to each LED source in the four LED lamp is controlled independently to allow the lamp to cover a full range of colors and CRIs. One power supply arrangement for the four LED lamp is two parallel LED channels with two LED sources in serial in each of the LED channels. The basic electronic topology can be a hysteretic buck converter with a channel switch controlling the current flow through each channel. Both the pulse width and amplitude of the current flow through each channel are variable. Upper and lower hysteresis operating limits set the pulse amplitude. A shunt switch parallel to each LED source controls the current flow through each LED source by shorting out the particular LED source.

The hysteresis limits can be set to maximize the duty cycle for one of LED sources in each channel. The channel current can be reduced to produce the required amount of light with the duty cycle of one LED source in each channel maximized. This saves energy in the electronics and results in efficient generation of light by the LEDs, which generally emit light more efficiently at lower current than at higher current.

The LED sources for a lamp are typically selected to be efficient when generating light at an optimum color and CRI, i.e., the duty cycles of all four LED sources will be large at the optimum color and CRI. However, problems arise and the lamp may not be efficient when a different color is selected. For example, a RGBA lamp designed for white light generation will have high power dissipation in a channel with blue and red LED sources when operation at a blue color is selected. The blue LED source will be mostly on, i.e., the blue LED source will have a high duty cycle, and the red LED source will be mostly off, i.e., have a low duty cycle. This will result in high power losses because the shunt switch parallel to the red LED source will be closed most of the time, shorting across the red LED source and dissipating power from the channel current. In another example with a green and amber LED source in one channel, the green LED source will be full on and the amber LED source will be mostly off when the user requests high light intensity with lower CRI. The mismatch of the demand on the LED sources in the channel will result in high power dissipation from the shunt switch parallel to the amber LED source. For a 1 Amp channel current through a shunt switch resistance of 220 mg $\Omega$, the power dissipation is 0.22 Watts. When one of the LED sources in each of the channels is mostly off, the combined power dissipation from the two channels is 0.44 Watts.

The power loss at the shunt switch not only reduces lamp efficiency, but also causes heat problems. The current lost in the shunt switch is converted to heat and must be transferred from the lamp and its associated chips and circuits to avoid operating problems from overheating. Besides the shunt switches, there are other sources of heat, such as the channel switches controlling the current level in the two channels. Unfortunately, lamp applications often have limited space on and around the lamp to allow installation of heat sinks for improved heat transfer from the lamp. Lack of heat sinks restricts the applications in which the LED lamps can be used and restricts the range of colors over which a lamp can operate. The lamp may even be derated from its design operating point to avoid overheating.

It would be desirable to have an LED lamp power management system and method that would overcome the above disadvantages.

One aspect of the present invention provides an LED lamp including an LED controller; a plurality of LED channels operably connected to the LED controller, each of the plurality of LED channels having a channel switch in series with at least one shunted LED circuit, the shunted LED circuit having a shunt switch in parallel with an LED source. The LED controller reduces power loss in one of the channel switch and the shunt switch when LED lamp electronics power loss ($P_{loss}$) exceeds an LED lamp electronics power loss limit ($P_{lim}$); and each of the channel switches receives a channel switch control signal from the LED controller and each of the shunt switches receives a shunt switch control signal from the LED controller.

Another aspect of the present invention provides a method of LED lamp power management including providing an LED lamp having a plurality of LED channels, each of the plurality of LED channels having a channel switch in series with at least one shunted LED circuit, the shunted LED circuit having a shunt switch in parallel with an LED source; initializing LED lamp settings for the LED lamp; calculating lumen fractions for each of the LED sources from the LED lamp settings; calculating duty cycles for the channel switches and the shunt switches from the lumen fractions; calculating an LED lamp electronics power loss ($P_{loss}$) for the LED lamp from the duty cycles; determining whether the LED lamp electronics power loss ($P_{loss}$) is less than an LED lamp electronics power loss limit ($P_{lim}$); determining whether channel switch power ($P_{main}$) for the channel switches is less than shunt switch power ($P_{bypass}$) for the shunt switches when the LED lamp electronics power loss ($P_{loss}$) is not less than the LED lamp electronics power loss limit ($P_{lim}$); reducing the channel switch power ($P_{main}$) when the channel switch power ($P_{main}$) is not less than the shunt switch power ($P_{bypass}$); and reducing the shunt switch power ($P_{bypass}$) when the channel switch power ($P_{main}$) is less than the shunt switch power ($P_{bypass}$).

Another aspect of the present invention provides a system of LED lamp power management including an LED lamp having a plurality of LED channels, each of the plurality of LED channels having a channel switch in series with at least one shunted LED circuit, the shunted LED circuit having a shunt switch in parallel with an LED source; means for initializing LED lamp settings for the LED lamp; means for calculating lumen fractions for each of the LED sources from the LED lamp settings; means for calculating duty cycles for the channel switches and the shunt switches from the lumen fractions; means for calculating an LED lamp electronics power loss ($P_{loss}$) for the LED lamp from the duty cycles; means for determining whether the LED lamp electronics power loss ($P_{loss}$) is less than an LED lamp electronics power loss limit ($P_{lim}$); means for determining whether channel switch power ($P_{main}$) for the channel switches is less than shunt switch power ($P_{bypass}$) for the shunt switches when the LED lamp electronics power loss ($P_{loss}$) is not less than the LED lamp electronics power loss limit ($P_{lim}$); means for reducing the channel switch power ($P_{main}$) when the channel switch power ($P_{main}$) is not less than the shunt switch power ($P_{bypass}$); and means for reducing the shunt switch power ($P_{bypass}$) when the channel switch power ($P_{main}$) is less than the shunt switch power ($P_{bypass}$).

The foregoing and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

FIG. 3 is a schematic diagram of another embodiment of an LED lamp power management system in accordance with the present invention.

FIG. 1 is a schematic diagram of an LED lamp power management system in accordance with the present invention. In this example, the LED lamp is a dual channel circuit, dual LED circuit lamp, i.e., the LED lamp has two LED channels with two shunted LED circuits per LED channel.

Figure 1:
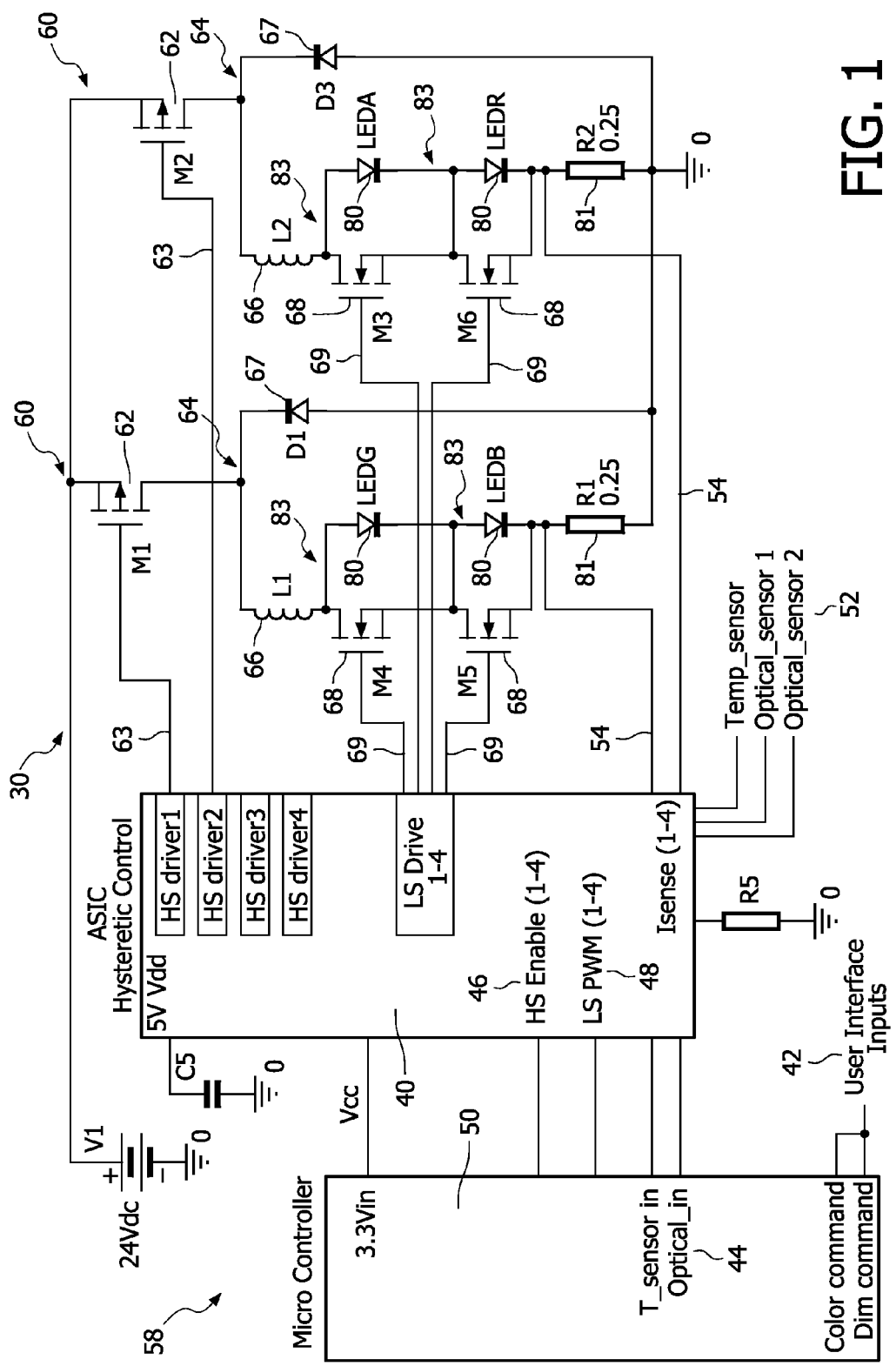
FIG. 1 is a schematic diagram of an LED lamp power management system in accordance with the present invention.

The LED lamp 30 employing the power management system includes an LED controller 58, which has a microcontroller 40 operably connected to an application specific integrated circuit (ASIC) hysteretic control 50, controlling power to two LED channels 60. Each LED channel 60 has a channel switch 62 and an LED circuit 64 connected in series between voltage and common. Each channel switch 62 receives a channel switch control signal 63 from the ASIC hysteretic control 50 to control current flow through the LED channel 60. In this example, each LED circuit 64 includes a diode 67 in parallel with an inductor 66 in series with two shunted LED circuits 83 and a resistor 81. Each shunted LED circuit 83 includes a shunt switch 68 in parallel with an LED source 80. The LED source 80 includes one or more LEDs connected in series and/or parallel to each other to generate light of a desired color or wavelength. Each of the shunt switches 68 receives a shunt switch control signal 69 from the ASIC hysteretic control 50. The shunt switch 68 shorts the channel current around its associated LED source to control the light output of the associated LED source. In this example, the basic electronic topology is a hysteretic buck converter. The LED controller 58 includes data storage for storing operating data, such as measured optical flux for the LED sources 80, initial lamp settings, measured operating parameters, operating parameter limits, and the like. Those skilled in the art will appreciate that the LED controller 58 can be a single integrated circuit or a number of operably connected integrated circuits providing the desired functions. For example, the LED controller 58 can be a single integrated circuit including a microprocessor with built-in memory, or can be two integrated circuits with one including a microprocessor and the other including memory.

The color output of each LED source 80 can be selected to produce the light output from the LED lamp 30 as desired for a particular purpose. In one embodiment, the LED sources are Red-Green-Blue-Amber (RGBA). In another embodiment, the LED sources are Red-Green-Blue-White (RGBW). In one embodiment, the LED sources 80 generating green and blue light can be in one LED channel 60 and the LED sources 80 generating amber and red light can be in another LED channel 60.

The microcontroller 40 receives user input signals 42, such as color command signals, dim command signals, or the like. The microcontroller 40 can also receive microcontroller feedback signals 44, such as temperature sensor signals, optical sensor signals, or the like, as desired for a particular application. In one embodiment, the feedback signals 44 are generated by the ASIC hysteretic control 50 from control feedback signals 52, such as temperature sensor signals, optical sensor signals, or the like, as desired for a particular application. The microcontroller 40 generates a high side (HS) enable signal 46 and a low side pulse width modulation (LS PWM) signal 48, which are provided to the ASIC hysteretic control 50, in response to the user input signals 42, and, optionally, the microcontroller feedback signals 44.

The ASIC hysteretic control 50 also receives current feedback signals 54 which indicate the current through each of the LED channels 60 and is responsive to the current feedback signals 54 to adjust the channel switch control signals 63. The ASIC hysteretic control 50 generates the channel switch control signals 63 and the shunt switch control signals 69 in response to the HS enable signals 46, LS PWM signals 48, current feedback signals 54, and, optionally, the control feedback signals 52.

In operation, the user provides user input signals 42 to the microcontroller 40, which generates HS enable signals 46 and LS PWM signals 48. The ASIC hysteretic control 50 receives the HS enable signals 46 and LS PWM signals 48 and generates the channel switch control signals 63 and shunt switch control signals 69. The LED controller 58 can implement the LED power management method as described in association with FIG. 2 below in generating the channel switch control signals 63 and shunt switch control signals 69. Referring to FIG. 1, a channel switch control signal 63 is provided to each of the channel switches 62 to control current flow through the LED channel 60 and a shunt switch control signal 69 is provided to each of the shunt switches 68 to control the light output of the associated LED source. In one embodiment, the ASIC hysteretic control 50 receives and is responsive to current feedback signals 54 from the LED channels 60. In another embodiment, the ASIC hysteretic control 50 receives and is responsive to control feedback signals 52 from temperature and/or one or more optical sensors (not shown). Those skilled in the art will appreciate that the LED controller 58 can receive system control signals as desired for a particular lighting system application. System control signals can be generated by and/or in accordance with wired control schemes, such as a DALI protocol, a DMX protocol, or the like, or with wireless control schemes, such as a Zigbee protocol or the like. In one embodiment, the LED controller 58 can transmit system control signals to other lamps in a lighting system to direct the lamps to make the same changes as the originating lamp made. For example, the LED controller 58 can transmit a system control signal instructing the other lamps in a room to change light color output to match color changes in the originating lamp, as may be required to reduce power loss in the originating lamp.

Figure 2:
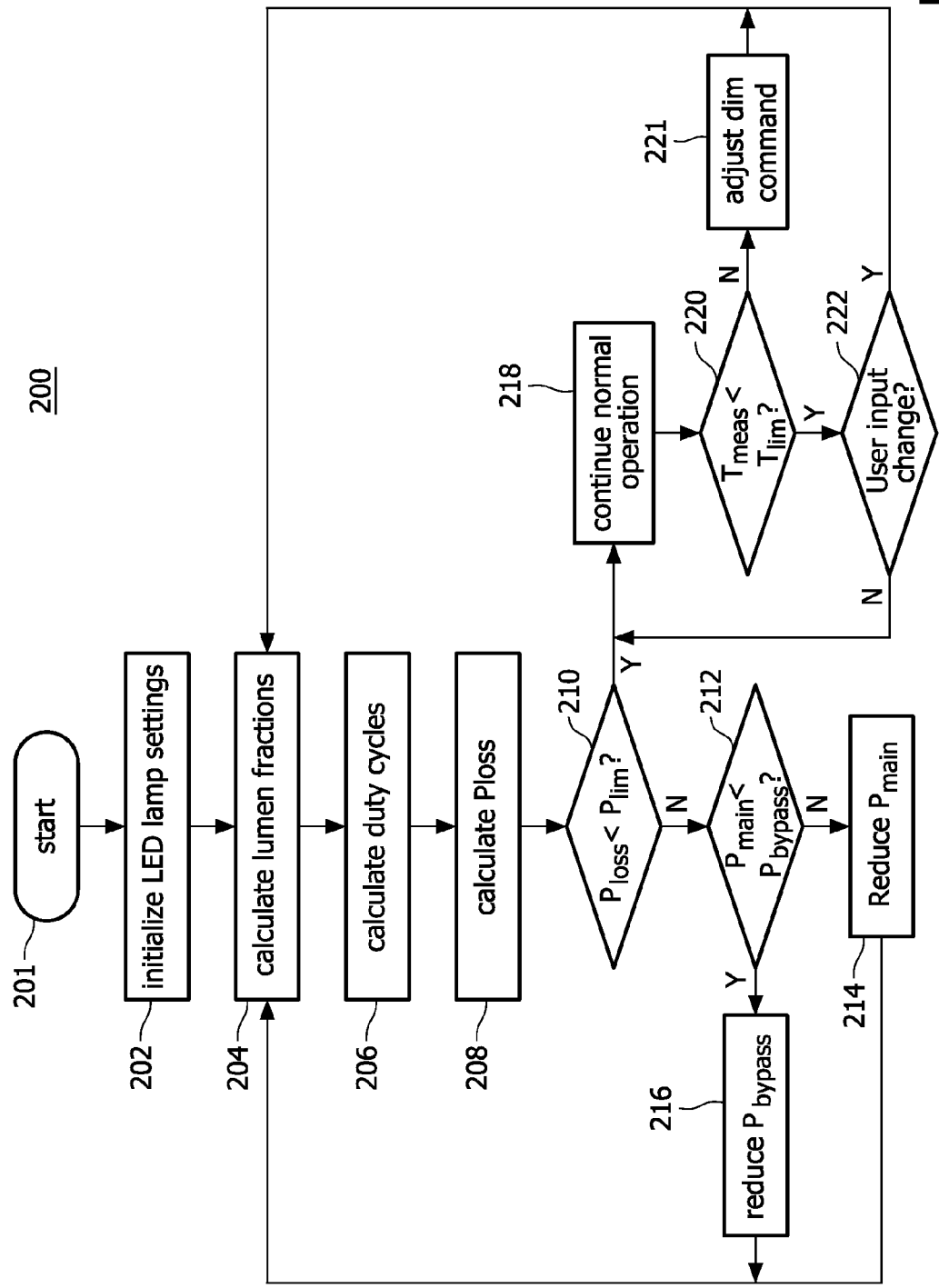
FIG. 2 is a flow chart of an LED power management method in accordance with the present invention.

FIG. 2 is a flow chart of an LED power management method in accordance with the present invention. The LED lamp has a number of LED channels, each of which has a channel switch in series with a number of LED circuits. Each of the LED circuits has a shunt switch in parallel with an LED source. In one embodiment, the LED lamp is a dual channel circuit, dual LED circuit lamp as illustrated in FIG. 1. In another embodiment, the LED lamp is a quad channel circuit, single LED circuit lamp as illustrated in FIG. 3.

Referring to FIG. 2, the method 200 starts at 201 and includes initializing LED lamp settings for the LED lamp 202, calculating lumen fractions for each of the LED sources from the LED lamp settings 204, calculating duty cycles for the shunt switches from the lumen fractions 206, and calculating LED lamp electronics power loss ($P_{loss}$) for the LED lamp from the duty cycles 208. The LED lamp electronics power loss ($P_{loss}$) accounts for power loss in the LED lamp electronics and does not include power loss in the LED sources.

The method 200 continues with determining whether the LED lamp electronics power loss ($P_{loss}$) is less than an LED lamp electronics power loss limit ($P_{lim}$) 210. When the LED lamp electronics power loss ($P_{loss}$) is not less than the LED lamp electronics power loss limit ($P_{lim}$), it is determined whether the channel switch power ($P_{main}$) is less than the shunt switch power ($P_{bypass}$). When the channel switch power ($P_{main}$) is not less than the shunt switch power ($P_{bypass}$), the channel switch power ($P_{main}$) is reduced 214 and the method 200 can continue with calculating updated lumen fractions 204. When the channel switch power ($P_{main}$) is less than the shunt switch power ($P_{bypass}$), the shunt switch power ($P_{bypass}$) is reduced 216 and the method 200 can continue with calculating updated lumen fractions 204.

When the LED lamp electronics power loss ($P_{loss}$) is less than the LED lamp electronics power loss limit ($P_{lim}$), normal operation can continue 218. In one embodiment, temperature of the LED lamp can be monitored to determine whether a measured temperature ($T_{meas}$) is less than a temperature limit ($T_{lim}$) 220. When the measured temperature ($T_{meas}$) is not less than the temperature limit ($T_{lim}$), the dim command can be adjusted to LED lamp light output 221 and the method 200 can continue with calculating updated lumen fractions for the dimmed LED lamp 204. Those skilled in the art will appreciate that the measured temperature ($T_{meas}$) can also be reduced by changing the CRI and/or color temperature as desired for a particular application. When the measured temperature ($T_{lim}$) is less than the temperature limit ($T_{lim}$), normal operation can continue 218. In one embodiment, the method 200 can continue with monitoring for user input changes 222. When there are user input changes, the method 200 can continue with calculating updated lumen fractions for the new user inputs 204. When there are no user input changes, normal operation can continue 218. Those skilled in the art will appreciate that the temperature monitoring 220 and/or the user input monitoring 222 can be omitted as desired for a particular application. Additional operating parameters, such as the flux of individual LED colors, LED lamp light color, LED lamp light quality, or the like, can be monitored as desired.

Initializing LED lamp settings for the LED lamp 202 can include initializing LED lamp settings such as color settings, dim settings, and the like. The initial values can be predetermined by the manufacturer, lighting designer, or can be stored user inputs from a previous use.

Calculating an LED lamp electronics power loss ($P_{loss}$) for the LED lamp from the duty cycles 208 can include calculating individual power losses for the channel switches, shunt switches, and the like, and summing the individual power losses to calculate the total LED lamp electronics power loss ($P_{loss}$) for the LED lamp.

Reducing the channel switch power ($P_{main}$) 214 can include the actions of reducing the LED channel current through one or more LED channels to dim the LED lamp and/or widening the hysteresis window of the one or more LED channels to reduce switching frequency of the channel switches. Widening the hysteresis window maintains the same average current through the LED sources at a lower frequency. This can cause a minor color shift, however, since the waveform at the reduced frequency may be different than the waveform used to calibrate the LED lamp. Those skilled in the art will appreciate that the amount of reduction in the channel switch power ($P_{main}$) can be selected as desired for a particular application.

The actions taken to reducing the channel switch power ($P_{main}$) can be taken in different order and degree. The dimming by LED channel current reduction and the widening of the hysteresis window can be used separately or in combination as desired for a particular application. In one embodiment, the lighting designer can specify the preferred order of actions, i.e., whether reducing the LED channel current through one or more LED channels or widening of the hysteresis window takes place first. In another embodiment, the preferred order of actions is predetermined by the manufacturer. In yet another embodiment, a first action can be performed until a first limit is reached, then a second action can be performed until a second limit is reached, then the first action can be performed again. For example, LED channel current can be reduced until the light output is below a first limit, then the hysteresis window can be widened until the color reaches a second limit, then the LED channel current can be reduced further. Those skilled in the art will appreciate that the different approaches may not be suitable for a particular application. For example, dimming the LED lamp may not be desirable when a minimum light flux is required and the LED lamp is already operating at the minimum. In another example, widening the hysteresis window may not be desirable when a constant light color is required.

Reducing the shunt switch power ($P_{bypass}$) 216 can include reducing the LED channel current through one or more LED channels to dim the LED lamp, changing light color to equalize duty cycles of LED sources in one or more LED channels, and/or changing color rendering index (CRI) to equalize duty cycles of LED sources in one or more LED channels. Changing light color to equalize duty cycles of LED sources in each LED channel allows reduction of the current through the LED channels to maximize the duty cycles of the LED sources in each channel. Changing the color rendering index (CRI) to equalize duty cycles of LED sources in each LED channel allows reduction of the current through the LED channels to maximize the duty cycles of the LED sources in each LED channel while maintaining the same color point and intensity for the LED lamp. Those skilled in the art will appreciate that the amount of reduction in the shunt switch power ($P_{bypass}$) can be selected as desired for a particular application.

The actions taken to reduce the shunt switch power ($P_{bypass}$) can be taken in different order and degree. The dimming by LED channel current reduction, reducing switching frequency, changing light color, and/or changing color rendering index (CRI) can be used separately or in combination as desired for a particular application. In one embodiment, the lighting designer can specify the preferred order of actions, i.e., whether reducing LED channel current, reducing switching frequency, changing light color, or changing color rendering index (CRI) takes place first. In another embodiment, the preferred order of actions is predetermined by the manufacturer. In yet another embodiment, a first action can be performed until a first limit is reached, then a second action can be performed until a second limit is reached, then the first action can be performed again. For example, the LED channel current can be reduced until the light output is below a first limit, then the light color can be changed until the color reaches a second limit, then the LED channel current can be reduced further. The various actions can be performed in any order and any degree desired. Those skilled in the art will appreciate that the different approaches may not be suitable for a particular application. For example, dimming the LED lamp may not be desirable when a minimum light flux is required and the LED lamp is already operating at the minimum. In another example, changing light color may not be desirable when a constant light color is required. In yet another example, changing color rendering index (CRI) may not be desirable when a certain color appearance is required.

During normal operation 218 when the LED lamp electronics power loss ($P_{loss}$) is less than the LED lamp electronics power loss limit ($P_{lim}$), user inputs and operating parameters of the LED lamp can be monitored. Monitoring the measured temperature ($T_{meas}$) of the LED lamp to determine that the measured temperature ($T_{meas}$) is less than a temperature limit ($T_{lim}$) 220 can include monitoring the measured temperature ($T_{meas}$) of the LED lamp with a temperature sensor, such as a thermistor, negative temperature coefficient (NTC) thermistor, thermocouple, or the like, thermally coupled to the LED lamp. The measured temperature ($T_{meas}$) can account for power loss in the LED lamp electronics and/or power loss in the LED sources, depending on temperature sensor location and thermal coupling. In another embodiment, monitoring the measured temperature ($T_{meas}$) of the LED lamp can include estimating the measured temperature ($T_{meas}$) from the operating parameters at the microcontroller. Adjusting the dim command 221 when the measured temperature ($T_{meas}$) is not less than the temperature limit ($T_{lim}$) can include adjusting the dim command proportionately for the amount that the measured temperature ($T_{meas}$) exceeds the temperature limit ($T_{lim}$) to a dimmer LED lamp setting. Monitoring for user input changes 222 can include monitoring for user input changes, such as changes in the color command signals, dim command signals, or the like, for a new LED lamp setting. The lumen fractions can be calculated 204 for the dimmed LED lamp settings to produce a lower temperature and/or new user inputs for the new LED lamp setting.

Those skilled in the art will appreciate that the operating parameters of the LED lamp can also be monitored when the LED lamp electronics power loss ($P_{loss}$) is greater than or equal to the LED lamp electronics power loss limit ($P_{lim}$), as desired for a particular application. For example, the corrective measures of reducing the channel switch power ($P_{main}$) 214 or reducing the shunt switch power ($P_{bypass}$) 216 may be insufficient to assure that the LED lamp electronics power loss ($P_{loss}$) is less than an LED lamp electronics power loss limit ($P^{lim}$). The measured temperature ($T_{meas}$) of the LED lamp can be monitored and the dim command adjusted when the measured temperature ($T_{meas}$) is not less than the temperature limit ($T_{lim}$) and when the corrective measures are insufficient to reduce the LED lamp electronics power loss ($P_{loss}$) below the LED lamp electronics power loss limit ($P_{lim}$). In one embodiment, the operating parameters of the LED lamp can be monitored when the microcontroller determines that the corrective measures are insufficient. In another embodiment, the operating parameters of the LED lamp can be monitored when the corrective measures of reducing the channel switch power ($P_{lim}$) 214 and/or reducing the shunt switch power ($P_{bypass}$) 216 have been performed a predetermined number of times without the LED lamp electronics power loss ($P_{loss}$) being reduced below the LED lamp electronics power loss limit ($P_{lim}$).

FIG. 3 in which like elements share like reference numbers with FIG. 1, is a schematic diagram of another embodiment of an LED lamp power management system in accordance with the present invention. In this example, the LED lamp is a quad channel circuit, single LED circuit lamp, i.e., the LED lamp has four LED channels with one shunted LED circuit per LED channel. A different color LED source can be provided in each of the LED channels, so that the current can be controlled for each of the LED colors. Power losses to the shunt switches can be minimized because the current through an LED channel can be turned off with the channel switch for the LED channel when a particular color is not needed.

The LED lamp 30 employing the power management system includes an LED controller 58, which has a microcontroller 40 operably connected to an application specific integrated circuit (ASIC) hysteretic control 50, controlling power to four LED channels 60.

Each LED channel 60 has a channel switch 62 and LED circuit 64 connected in series between voltage and common. Each channel switch 62 receives a channel switch control signal 63 from the ASIC hysteretic control 50 to control current flow through the LED channel 60. In this example, each LED circuit 64 includes a diode 67 in parallel with an inductor 66 in series with a shunt switch 68. Each of the shunt switches 68 receives a shunt switch control signal 69 from the ASIC hysteretic control 50 and is connected in parallel to an LED source 80. The shunt switch 68 shorts the channel current around its associated LED source to control the light output of the associated LED source. In this example, the basic electronic topology is a hysteretic buck converter. The inductor 66 for each LED channel 60 can be sized to provide the desired switching frequency for the particular LED 60 in that LED channel 60. In one embodiment, the LED sources 80 in each of the LED channels 60 can generate light of different colors.

In operation, the user provides user input signals 42 to the microcontroller 40, which generates HS enable signals 46 and LS PWM signals 48. The ASIC hysteretic control 50 receives the HS enable signals 46 and LS PWM signals 48 and generates the channel switch control signals 63 and shunt switch control signals 69. The LED controller 58 can implement the LED power management method as described in association with FIG. 2 above in generating the channel switch control signals 63 and shunt switch control signals 69. Referring to FIG. 3, a channel switch control signal 63 is provided to each of the channel switches 62 to control current flow through the LED channel 60 and a shunt switch control signal 69 is provided to each of the shunt switches 68 to control the light output of the associated LED.

In one embodiment, the inductor 66 for each LED channel 60 includes two or more inductors, with one of the inductors sized to saturate at a high current. The current is high during normal operation at the design operating point generating white light at an optimum color and CRI, so one inductor in each LED channel 60 is normally saturated. When the current in the LED channel 60 is low, such as operation at a different color and/or CRI from the design operating point, the one saturated inductor in each LED channel 60 becomes unsaturated. This increases the total inductance of the inductor 66 and reduces the switching frequency for the LED channel 60. The two or more inductors of the inductor 66 for each LED channel 60 can be selected so the hysteresis window can be selected to be a constant percentage of the current level through the LED channel 60, while still keeping the switching frequency in a reasonable range. For example, if the current is lowered by a factor of 10 and it is desired to keep the hysteresis window still 10% of the average current, the switching frequency would go up by a factor of 10 if no saturable inductors are used. However, by using a saturable inductor with a value 9 times that of the non-saturated inductor, the total inductance will increase to 10 times the original value at low current levels (when the inductor becomes unsaturated). This allows the switching frequency to be unchanged as desired.

While the embodiments of the invention disclosed herein are presently considered to be preferred, various changes and modifications can be made without departing from the scope of the invention. The scope of the invention is indicated in the appended claims, and all changes that come within the meaning and range of equivalents are intended to be embraced therein.

The invention claimed is:

1. An LED lamp comprising:
an LED controller;
a plurality of LED channels operably connected to the LED controller, each of the plurality of LED channels having a channel switch in series with at least one shunted LED circuit, the shunted LED circuit having a shunt switch in parallel with an LED source;
wherein the LED controller reduces power loss in one of the channel switch and the shunt switch when LED lamp electronics power loss ($P_{loss}$) exceeds an LED lamp electronics power loss limit ($P_{lim}$).

2. The LED lamp of claim 1, wherein the LED controller comprises a microcontroller operably connected to an application specific integrated circuit (ASIC) hysteretic control.

3. The LED lamp of claim 1, wherein each of the LED sources generates light of a different color.

4. The LED lamp of claim 1, wherein the LED controller is responsive to user input signals selected from the group consisting of color command signals and dim command signals.

5. The LED lamp of claim 1, wherein each of the channel switches receives a channel switch control signal from the LED controller, and the LED controller is responsive to current feedback signals from each of the plurality of LED channels to adjust the channel switch control signals.

6. The LED lamp of claim 1, wherein the LED controller is responsive to control feedback signals selected from the group consisting of temperature sensor signals and optical sensor signals.

7. The LED lamp of claim 1, wherein the plurality of LED channels comprises a first LED channel having a first shunted LED circuit and a second shunted LED circuit, and a second LED channel having a third shunted LED circuit and a fourth shunted LED circuit.

8. The LED lamp of claim 1, wherein the plurality of LED channels comprises a first LED channel having a first shunted LED circuit, a second LED channel having a second shunted LED circuit, a third LED channel having a third shunted LED circuit, and a fourth LED channel having a fourth shunted LED circuit.

9. The LED lamp of claim 1, wherein each of the plurality of LED channels further comprises an inductor and resistor in series with the shunted LED circuit, and a diode in parallel with the inductor, the resistor, and the shunted LED circuit.

10. The LED lamp of claim 4, wherein the inductor in each of the plurality of LED channels is a plurality of inductors in series, at least one of the plurality of inductors being sized to saturate during normal operation at a design operating point.

* * * * *